(12) United States Patent
Mueller

(10) Patent No.: US 9,897,057 B2
(45) Date of Patent: Feb. 20, 2018

(54) VALVE FOR METERING A FLOWING MEDIUM

(71) Applicant: Robert Bosch GmbH, Stuttgart (DE)

(72) Inventor: Martin Mueller, Moeglingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 161 days.

(21) Appl. No.: 14/377,483

(22) PCT Filed: Jan. 25, 2013

(86) PCT No.: PCT/EP2013/051411
§ 371 (c)(1),
(2) Date: Aug. 7, 2014

(87) PCT Pub. No.: WO2013/117441
PCT Pub. Date: Aug. 15, 2013

(65) Prior Publication Data
US 2015/0041565 A1 Feb. 12, 2015

(30) Foreign Application Priority Data
Feb. 9, 2012 (DE) .......... 10 2012 201 940

(51) Int. Cl.
*F02M 61/16* (2006.01)
*F02M 37/22* (2006.01)
(Continued)

(52) U.S. Cl.
CPC .......... *F02M 61/165* (2013.01); *F02M 37/22* (2013.01); *F02M 63/0033* (2013.01);
(Continued)

(58) Field of Classification Search
CPC ............ F02M 61/165; F02M 63/0012; F02M 63/0033; B01D 29/11; B01D 29/114;
(Continued)

(56) References Cited

U.S. PATENT DOCUMENTS 1,757,690 A * 5/1930 Strindberg ............. B01D 46/00
126/299 F
5,088,650 A * 2/1992 Takagi ................... B01D 35/02
239/575
(Continued)

FOREIGN PATENT DOCUMENTS

DE        44 21 881      1/1996
DE   10 2005 037 265    2/2007
(Continued)

OTHER PUBLICATIONS

International Search Report, PCT International Application No. PCT/EP2013/051411, dated Jun. 20, 2013.

*Primary Examiner* — Arthur O Hall
*Assistant Examiner* — Tuongminh Pham
(74) *Attorney, Agent, or Firm* — Norton Rose Fulbright US LLP; Gerard Messina

(57) ABSTRACT

A valve for metering a flowing medium, particularly a fluid, which has a filter situated in the medium stream and has a filter ring that includes a plurality of filter pores and a support element supporting the filter ring on its outgoing flow side. The support element is developed as a radially elastic support ring having a plurality of through holes, which rests against the filter ring with radial prestressing.

15 Claims, 6 Drawing Sheets

(51) Int. Cl.
*F02M 63/00* (2006.01)
*B01D 29/11* (2006.01)
*B01D 29/60* (2006.01)
*B01D 35/04* (2006.01)
*B01D 35/00* (2006.01)
*F02M 51/06* (2006.01)

(52) U.S. Cl.
CPC ............ *B01D 29/11* (2013.01); *B01D 29/114* (2013.01); *B01D 29/60* (2013.01); *B01D 35/005* (2013.01); *B01D 35/04* (2013.01); *B01D 2201/0415* (2013.01); *F02M 51/0603* (2013.01); *F02M 2200/9015* (2013.01)

(58) Field of Classification Search
CPC ...... B01D 29/60; B01D 29/92; B01D 35/005; B01D 35/02; B01D 35/04; B01D 2201/0415; B01D 2201/0469; B01D 2201/16; B01D 2201/31; B01D 2201/316
USPC ......... 239/575, 590, DIG. 23; 137/544, 545, 137/549
See application file for complete search history.

(56) References Cited

U.S. PATENT DOCUMENTS

| | | | |
|---|---|---|---|
| 5,238,192 A | 8/1993 | McNair | |
| 5,301,874 A * | 4/1994 | Vogt | F02M 61/205 239/585.1 |
| 5,330,649 A * | 7/1994 | Hafner | F02M 61/165 137/549 |
| 5,641,126 A | 6/1997 | Nally et al. | |
| 5,807,483 A | 9/1998 | Cassidy et al. | |
| 6,135,094 A | 10/2000 | Okada et al. | |
| 6,206,205 B1 * | 3/2001 | Durre | B01D 29/111 210/457 |
| 7,770,812 B2 * | 8/2010 | Sebastian | F02M 51/0667 210/429 |
| 8,505,742 B2 * | 8/2013 | Hawkins | B01D 29/111 210/232 |
| 2010/0102146 A1 * | 4/2010 | Kitagawa | F02M 61/165 239/584 |
| 2011/0100899 A1 | 5/2011 | Howkins et al. | |

FOREIGN PATENT DOCUMENTS

| | | |
|---|---|---|
| DE | 10 2006 040 648 | 3/2008 |
| DE | 10 2009 026 532 | 12/2010 |
| JP | S63-128744 A | 6/1988 |
| JP | H05-149208 A | 6/1993 |
| JP | 4042948 A | 10/2002 |
| JP | 2005-349345 A | 12/2005 |
| JP | 4628461 A | 5/2010 |
| RU | 2155910 C2 | 9/2000 |
| SU | 1305424 A1 | 4/1987 |

* cited by examiner

VALVE FOR METERING A FLOWING MEDIUM

FIELD

The present invention relates to a valve for metering a flowing medium, in particular of a fluid.

BACKGROUND INFORMATION

One conventional injector valve for injecting fuel (described, e.g., in German Patent Application No. DE 10 2006 040 648 A1) has an hollow cylindrical valve body having at least one radial inlet bore, which connects the hollow interior of the valve body, which accommodates a valve needle, to an inlet for supplying the fuel. In the direction of flow of the fuel before the inlet bore, there is an annular filter, for filtering the fuel. The filter has a filter housing designated as a fixing device, and a filtration web made of metal or plastic that is fixed to the filter housing. The filter housing is preferably a plastic extrusion coating of the filtration web and seals the filter at the valve body. On the flow-away side of the filter, a supporting body in the form of a torus is connected in an attached form on the valve body, which is recessed in the area of the at least one inlet bore, and lies approximately centrically against the filtration web. On both sides of the torus there is in each case an annular groove present in the valve body, via which a plurality of inlet bores are able to communicate with each other.

In a fuel injector that is also conventional (described, e.g., in German Patent Application No. DE 10 2005 037 265 A1), the filter situated in the fuel flow has an hollow cylindrical filter housing having two contact rings that are at a distance from each other in the axial direction, which are connected to each other via at least three axially extending crosspieces. A tubular filtering area made of a screen mesh is firmly connected to the filter housing. On the flow-away side of the filter, a supporting body is provided that supports the filtering area. The supporting body has an hollow cylindrical supporting section having elevations supporting the filtering area, which are developed rib-shaped, for example, and rest against the filtering area only in a linear manner. Drain passages remain between the elevations, through which the filtered fuel is able to flow away. The supporting body is pushed into the filter housing all the way through a charging opening, after which the hollow cylindrical supporting section over the inner wall surface of the annular filter area.

SUMMARY

An example valve in accordance with the present invention may have the advantage that the entire filtering area of the filter ring rests on the supporting ring, and at no time is there a strain or even a deformation of the mechanically not very rigid filter ring. A rupturing of the filtering area, at the risk of flowing through of contaminations, and thus a failure of the valve, are reliably prevented. The filter according to the present invention having the prestressed supporting ring may be produced clearly more cost-effectively on the valve body or on the filter housing compared to filters having supporting bodies costly in manufacturing technology.

According to one advantageous specific embodiment of the present invention, the radial prestressing of the supporting ring is achieved in a simple manner by the outside diameter being only a little larger than the inside diameter. In the inserted position, the supporting ring expands and presses radially against the filter ring. Alternatively, the supporting ring may also be provided with a longitudinally continuous axial gap, and may be stressed by the expanding of the axial gap in the circumferential direction, in the inserted position.

According to one advantageous specific embodiment of the present invention, the hole cross section of the feed-through holes in the supporting ring is clearly greater than the pore size of the filter pores in the filter ring. Because of the large hole cross sections of the supporting ring, the effective filtering area of the filter ring resting against the supporting ring is diminished only a little.

According to one advantageous specific embodiment of the present invention, the filter ring is made of a finely meshed filtration web and the supporting ring is made of a coarsely meshed metal web or a perforated sheet metal or plastic jacket. Such a metal web or such a perforated jacket has a sufficiently high mechanical rigidity also to resist the stressing of the filter during partial plugging of the fine-meshed filtration web by depositing.

According to one advantageous specific embodiment of the present invention, the filter has a stiff cage enclosing the filter ring, having two end rings that are at an axial distance from each other and a plurality of axial crosspieces that connect the end rings and are at a circumferential distance from one another, the filter ring being fixed on the inside of the cage. The cage is preferably made of plastic, which is sprayed from the outside on the filter ring on one side. In this embodiment of the filter it is advantageous to provide the supporting ring, at at least one ring end, with an end section reduced in diameter. The end section preferably obtained by bending at right angles is, in this context, dimensioned only slightly smaller in inside diameter than the outer diameter of a valve body of the valve including at least one inlet bore for the metering opening, on which the filter, covering the inlet bore, is situated, so that the at least one end section is pressed on the valve body. Via the stressing of the at least one end section with the valve body, the supporting ring produces a radial stressing of the filtration web of the filter ring. When there is pressure stress or bending of the filtering area by the medium flowing through the filter radially from the outside to the inside, the supporting ring lying tightly against the filter ring supports the mechanically sensitive filtering area of the filter ring, that is only a little stressable, with zero play. The axial lengths of supporting ring and cage are so coordinated with each other that the at least one end section lies in the area of an end ring of the cage.

According to one advantageous specific embodiment of the present invention, one of the axial crosspieces of the cage carries a longitudinal rib and the supporting ring has an axial gap that extends in parallel to the axis of the ring, into which the longitudinal rib extends. Twisting of the supporting ring in the filter is prevented by the longitudinal rib in the cage and the axial gap in the supporting ring. In addition, the axial gap and the longitudinal rib may be utilized to effect the stressing, mentioned above, of the supporting ring in the circumferential direction by expanding the supporting ring, in that the ring edges bordering the axial gap are supported with force-locking on the side edges, facing away from one another, of the longitudinal rib.

According to one advantageous specific embodiment of the present invention, the supporting ring made up of a perforated sheet metal or plastic jacket is produced from a perforated plate by rolling or bending. The two facing longitudinal edges of the jacket lie across from each other either while leaving the axial gap at a distance at a distance opposite each other or they meet obtusely with each other and are welded. Overlapping of the jacket ends may also be considered, the supporting ring being welded in the area of overlapping.

In an alternative embodiment, the supporting ring is made of a wire, which in a meandering shape is bent at a meandering width extending over the axial width of the supporting ring and is then rolled or bent to an annular shape. The two outer meander branches, formed from the wire ends and facing each other, are welded to each other.

BRIEF DESCRIPTION OF THE DRAWINGS

The present invention is explained in greater detail below on the basis of exemplary embodiments shown in the figures.

DETAILED DESCRIPTION OF EXAMPLE EMBODIMENTS

Figure 1:
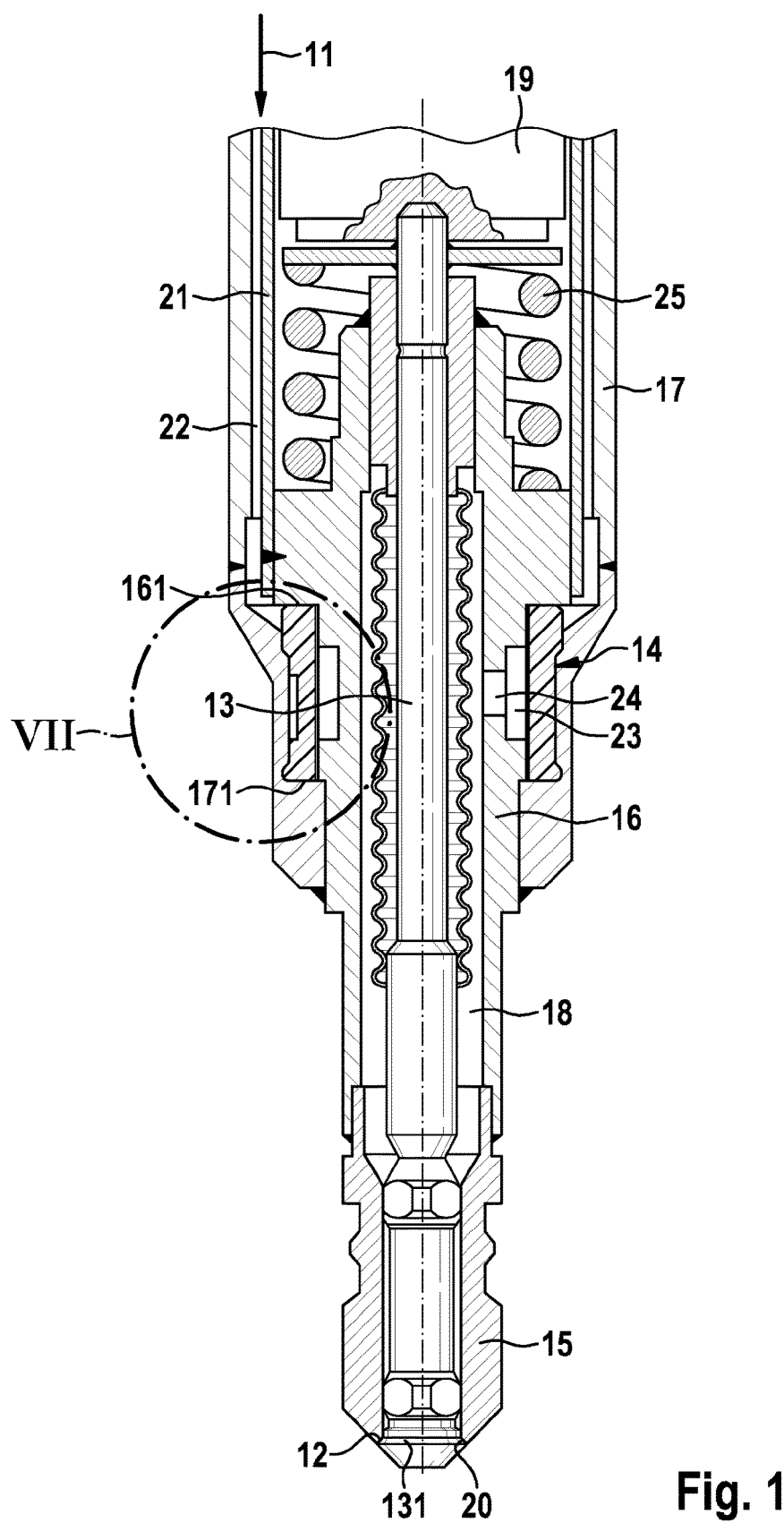
FIG. 1 shows, in a cutaway view, a longitudinal section of a valve for metering a flowing medium, having a filter situated in the medium flow.

The valve for metering a flowing medium, particularly a liquid, shown in longitudinal section in FIG. 1, is used, for example, as a valve for injecting fuel into the combustion cylinder of an internal combustion engines. In this context, FIG. 1 shows the longitudinal section of the end on the injection side of the fuel injector, the complete valve being shown and described, for example, in German Patent Application No. DE 10 2009 026 532 A1.

The valve has an inlet 11 for the medium, that is, for the fluid or the fuel, and a metering opening 12 for the medium, via which, using a valve member or a valve needle 13, a current metering quantity of the medium is controlled. In the medium flow developing between the inlet and metering opening 12, a filter 14 is situated for holding back particles contained in the medium from metering opening 12, filter 14 covering at least one inlet bore 24 to metering opening 12. Metering opening 12 is developed in a hollow nozzle body 15, which is affixed coaxially to a hollow valve body 16. Valve body 16 is accommodated in a valve housing 17, and partially projecting from it. Nozzle body 15 and valve body 16 enclose a valve space 18 that is connected upstream of metering opening 12, and it is penetrated coaxially by valve needle 13. Valve needle 13 exits in a manner, sealed from the medium, from valve space 18 at the end that is at a distance from the metering opening, and is here acted upon by an actuator 19, which is preferably a piezoelectric actuator 19, and which, together with a valve closing spring 25, that engages with valve needle 13, drives the axially displaceable valve needle 13 to perform a lifting movement. At its end distant from the actuator, valve needle 13 carries a closing member 131, which cooperates with a valve seat 20 which encloses metering opening 12 and is developed on nozzle body 15, to close and release metering opening 12. Actuator 19 is accommodated in a tube 21 that is fixed concentrically in valve housing 17, between tube 21 and valve housing 17 an annular gap 22 remaining, that is connected to inlet 11 which opens out into an annular groove, that is developed on valve body 16. From annular groove 23, the at least one inlet bore 24, applied to valve body 16 as a radial bore, leads into valve space 18 that is connected upstream of metering opening 12, so that, in the case of a plurality of inlet bores 24, annular groove 23 connects all the inlet bores 24 to one another. The medium existing under system pressure thus flows from inlet 11 via annular gap 22, annular groove 23 and the one or the plurality of inlet bores 24 into valve space 18. Closing member 131 is pressed onto valve seat 20 by valve closing spring 25 which is supported between valve needle 13 and valve body 16, and when actuator 19 has current applied to it, closing member 131 is lifted off valve seat 20 against the force of valve closing spring 25, and consequently metering opening 12 is released.

Figure 12:
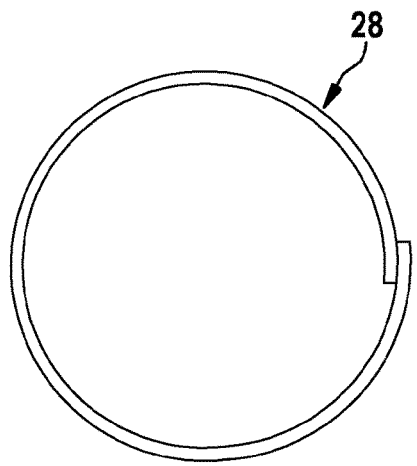
FIG. 12 shows an end-faced view of the supporting ring according to a sixth exemplary embodiment.
Figure 13:
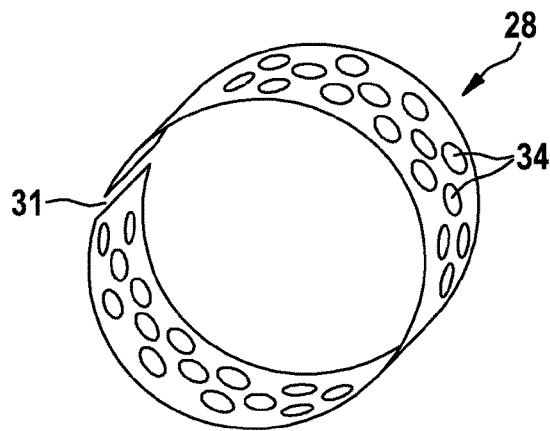
FIG. 13 shows a perspective view of the supporting ring according to a seventh exemplary embodiment.

Filter 14 situated in the medium stream is pushed onto valve body 16 to the extent that it completely covers annular groove 23 and thus inlet bores 24 as well. In this position, filter 14 is held axially immovably between a radial shoulder 161 developed on valve body 16 and a radial shoulder 171 developed on valve housing 17, and is fixed by valve housing 17 radially on valve body 16. Filter 14 has a filter ring 26 having a plurality of fine filter pores, and in the position described of filter 14 it has an outer incident flow side pointing towards inlet 11, and an inner outgoing flow side pointing towards metering opening 12, for the mechanical stabilization of the mechanically only slightly fixed filter ring 26, on its outflow side, a support element supporting filter ring 26 being present. As may be seen from the various views and sections, shown in FIGS. 2 through 6, of filter 14, the support element is developed as a radially elastic support ring 28, having a plurality of through holes, which rests against filter ring 26 with radial prestressing. For this purpose, the outer diameter of support ring 28 is made larger than the inner diameter of filter ring 26 by a measure which produces the prestressing. The cross section of the through holes in support ring 28 is many times greater than the pore size of the filter pores in the filter ring. In filter 14 shown in FIGS. 1 through 7 and the filter shown in FIG. 8, as well as additional filters 14 having support rings 28 shown in FIGS. 9 through 11, filter ring 26 is in each case made of a fine-meshed filtering mesh, and support ring 28 of a coarse-meshed metal mesh. For the sake of clarity, in the figures mentioned, the coarse-meshed metal web is indicated only in FIG. 10. Alternatively, support ring 28 may also be made of a perforated sheet metal or plastic jacket, like one that may be seen in an end-faced view in FIG. 12 and in perspective representation in FIG. 13. The through holes in support ring 28 are marked by 34 in FIG. 13. Such a support ring 28 is manufactured, for example, from a perforated, rectangular plate each having two parallel longitudinal edges and two transverse edges, by rolling or bending. In FIG. 13, the two transverse edges face each other at a distance, while an axial gap 31 is left, and in FIG. 12 the two plate ends overlap and are welded together. As is not shown here, the two transverse edges may also abut each other bluntly and be welded to each other along the contact location.

Figure 3:
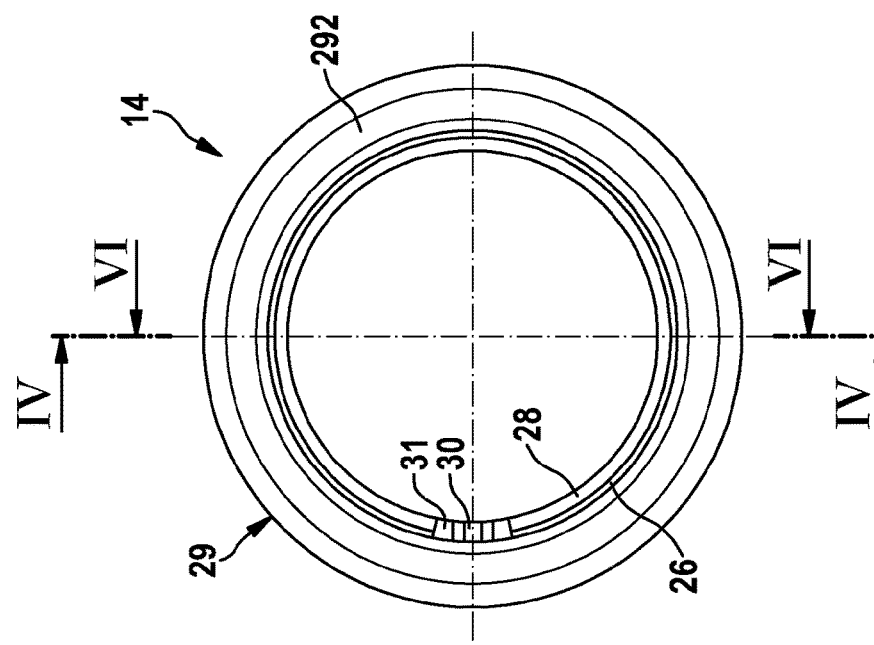
FIG. 3 shows an end-faced view of the filter in the direction of arrow III in FIG. 2.
Figure 2:
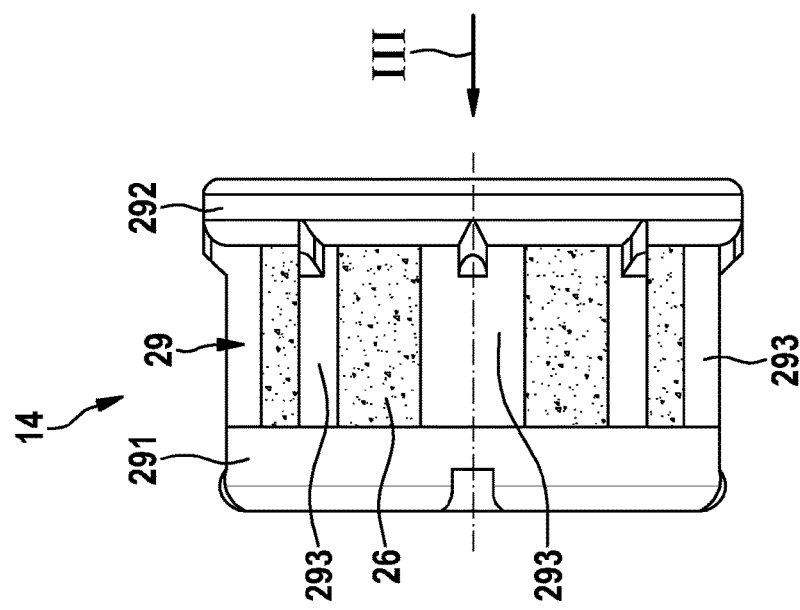
FIG. 2 shows a side view of the filter in the valve.
Figure 5:
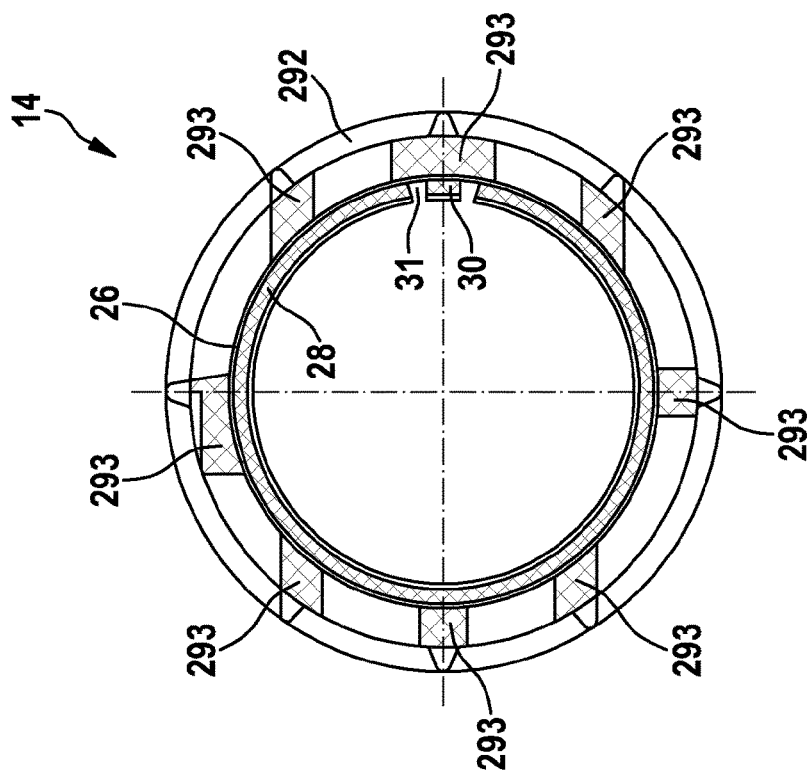
FIG. 5 shows a section of the filter along line V-V in FIG. 4.
Figure 4:
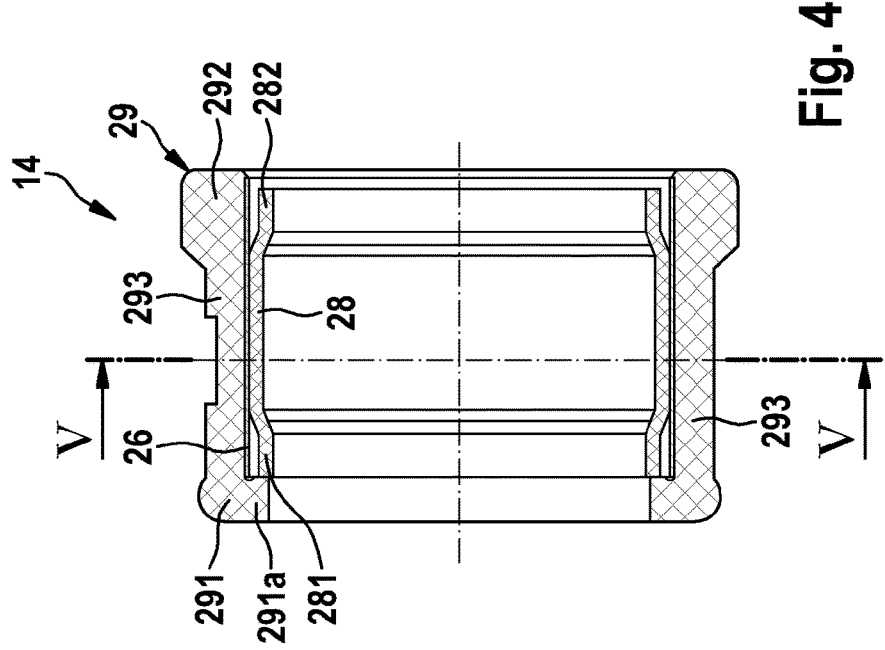
FIG. 4 shows a section of the filter along line IV-IV in FIG. 3.
Figure 6:
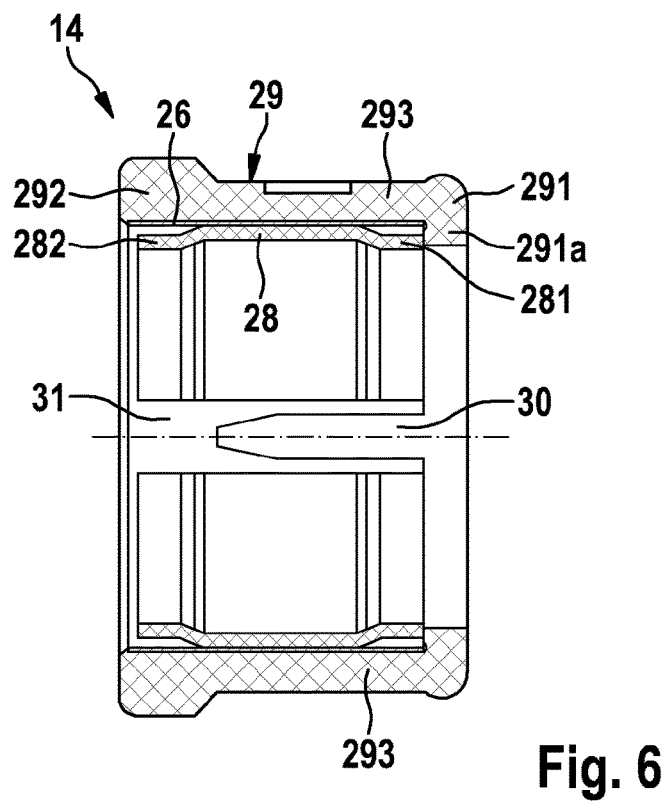
FIG. 6 shows a section of the filter along line VI-VI in FIG. 3.
Figure 7:
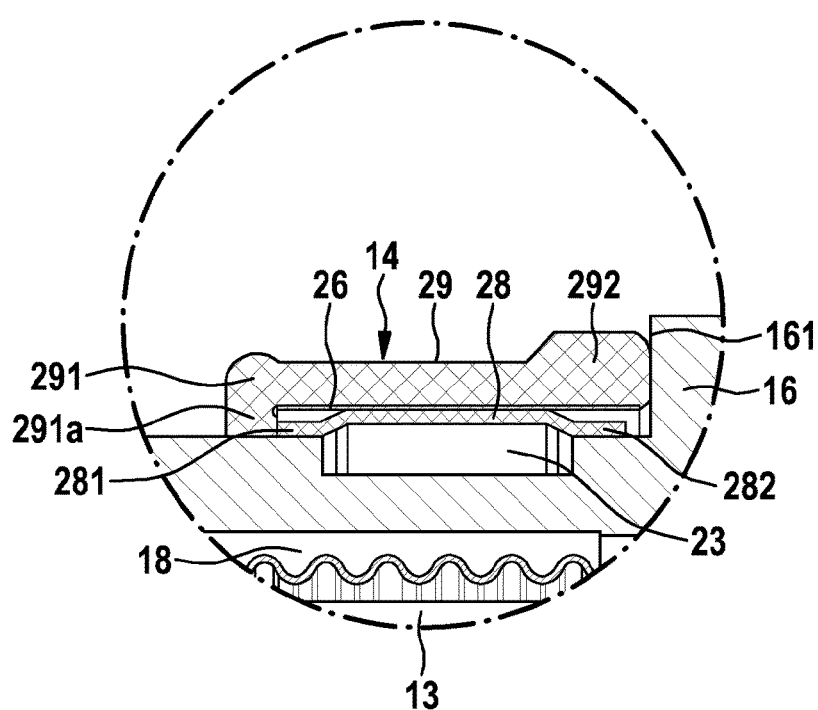
FIG. 7 shows an enlarged, detailed cutout VII in FIG. 1 of the filter and of a valve body of the valve carrying the filter.

Filter ring 26 is accommodated in a rigid cage 29, as shown in FIG. 2 in a side view, in FIG. 3 in a top view and in FIGS. 4 through 6 in various sectional representations. Cage 29 has two end rings 291 and 292 at a distance from each other, and a plurality of axial crosspieces 293 connecting the two end rings 291, 292 to each other, which are at a distance from one another in the circumferential direction. End ring 291 has a collar 291a projecting radially inwards, via which cage 29 sits upon valve body 16 with radial pressure, while the end face of end ring 292 is pressed as a radial sealing surface onto radial shoulder 161 of valve body 16 (FIGS. 1 and 7). Filter ring 26 is fastened to the inside of cage 29. Cage 29 is preferably made of plastic and the plastic is sprayed on one side on the outside of filter ring 26 that is made of the fine-meshed filtering web.

As is shown in the sectional representation of FIGS. 4, 6 and 7, support ring 28 has on its two ends in each case an end section 281 or 282 that are reduced in diameter. The diameter reduction, brought about preferably by bending at right angles, is done in such a way that the inside diameter of end sections 281, 282 is slightly smalled than the outside diameter of valve body 16 in the area of the filter seat on valve body 16, so that, when filter 14 is placed onto valve body 16, end sections 281, 282 warp on valve body 16 (FIG. 7). Via this warping on valve body 16, a radial warping is produced of the filter web of the filter ring. At pressure stressing or st bending through the filter web by the medium flowing through filter 14 from the outside to the inside, support ring 28, which rests tightly against filter ring 26, even in the center region of filter ring 26, reliably supports the fine-meshed filter web, which cannot take much mechanical stress. The axial length of support ring 28 is coordinated with the axial length of cage 29 so that in each case an end section 281, 282 lies in the region of an end ring 291 or 292.

Figure 8:
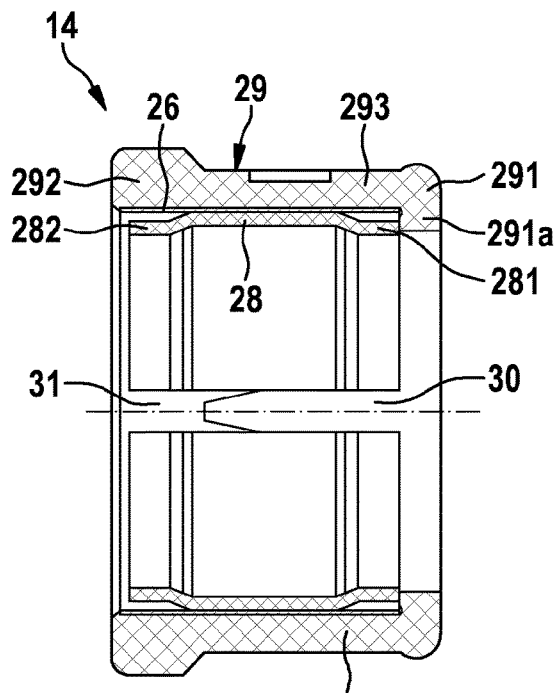
FIG. 8 shows the same illustration of the filter as in FIG. 6 with a first modification.

In order to prevent the twisting of support ring 28 within filter 14, one of axial crosspieces 293 of cage 29 is provided with a longitudinal rib 30, which runs on the inside of axial crosspieces 293 over at least a part of axial crosspieces, and support ring 28 has an axial gap 31 that extends in parallel to the ring axis over the entire ring width, into which longitudinal rib 30 extends (FIGS. 3, 5 and 6). Longitudinal rib 30 may also be used to stress support ring 28 in the circumferential direction. As shown in FIG. 8, in this case axial gap 31 in support ring 28 is dimensioned a little narrower than the width of longitudinal rib 30 seen in the circumferential direction. In the installation position, after setting support ring 28 into cage 29, the two axial edges of support ring 28 bordering axial gap 31 then support themselves with force-locking on the side edges of longitudinal rib 30, that face away from each other. In such a case it is of advantage to make the coarse-meshed metal web of support ring 28 more greatly resilient, which may be achieved, for example by a diagonal positioning of the web threads.

Figure 9:
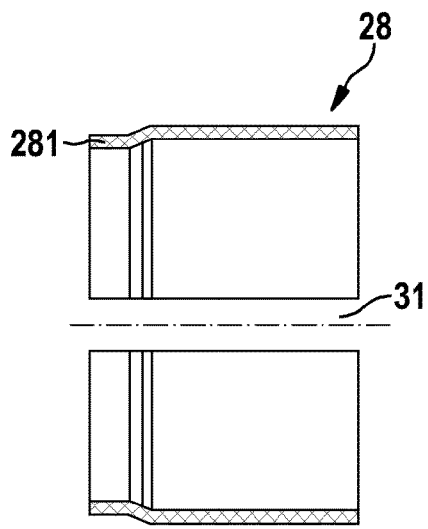
FIG. 9 shows a section of the supporting ring along line VI-VI in FIG. 3, according to a third exemplary embodiment.
Figure 10:
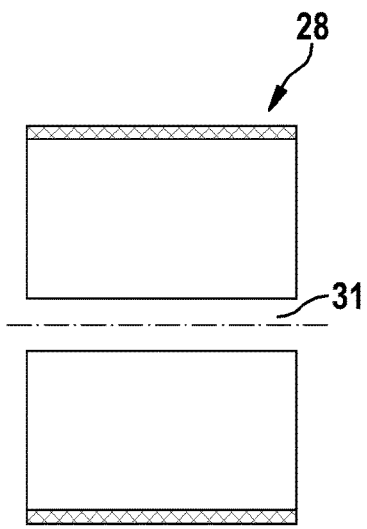
FIG. 10 shows an identical representation as in FIG. 9 of the supporting ring according to a fourth exemplary embodiment.
Figure 11:
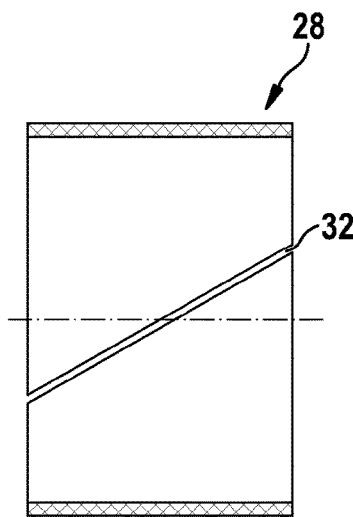
FIG. 11 shows an identical representation as in FIG. 9 of the supporting ring according to a fifth exemplary embodiment.

In FIGS. 9 to 11, additional alternative specific embodiments of support ring 28 are shown. The support ring 28 shown in FIG. 9 in section along Line VI-VI in FIG. 3 has only one end section 281 having a reduced diameter. In the case of support ring 28 shown in FIG. 10, also in a section along line VI-VI in FIG. 3, the end sections having reduced diameters have been omitted altogether. Both support ring 28 in FIG. 9 and support ring 28 in FIG. 10, just as support ring 28 in filter 14 of FIGS. 2 through 7 and in filter 14 of FIG. 8, have axial gap 31 extending over the entire ring width, parallel to the ring axis. By contrast to this, support ring 28 according to FIG. 11 has a diagonal gap 32 running at an acute angle to the ring axis over the axial ring width, while support ring 28 according to FIG. 12 is completely closed, that is, it has no axial gap. When using support rings 28 according to FIGS. 11 and 12, cage 29 connected to filter ring 26 has no longitudinal rib.

Figure 14:
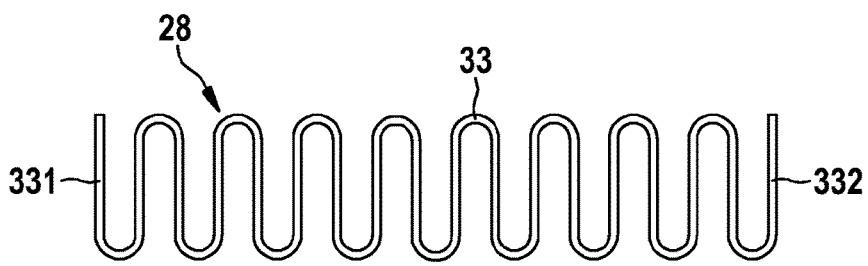
FIG. 14 shows a development of the supporting ring according to an eighth exemplary embodiment.

In one further embodiment variant of support ring 28, the latter is made of a wire 33, which is bent in meandering form at a meandering width that extends over the axial width of support ring 28. In FIG. 14, this support ring 28 is shown in a developed view. After curling, rolling or bending the meander-shaped bent wire 33 to form support ring 28 at an outside diameter correspondingly adjusted to filter ring 26, the two outer meander branches 331, 332, formed by the wire ends, lie in parallel opposite each other and are preferably welded to each other. However, between the two outer meander branches 331, 332, an axial gap 31 may also be held in reserve. Just as in the case of the other support rings 28 according to FIGS. 9 through 13, this support ring 28 is also set into the inside of filter ring 26 held by cage 29, and presses radially against its filter area.

What is claimed is:

1. A valve for metering a flowing medium, comprising:
a filter situated in a medium stream flowing from an inlet to a metering opening;
a filter ring containing a plurality of filter pores having an outer incident flow side pointing towards the inlet and an inner outgoing flow side pointing towards the metering opening; and
a supporting body supporting the filter ring on its flow-away side, wherein the supporting body is a radially elastic support ring having a plurality of through holes, which rests against the filter ring with radial prestressing,
wherein the filter has a rigid cage enclosing the filter ring having two end rings that are at an axial distance from each other and a plurality of axial crosspieces that connect the end rings to each other and are at a distance from one another in the circumferential direction, and the filter ring is affixed to the inner side of the cage, and
wherein one of the axial crosspieces of the cage carries a longitudinal rib, and the support ring has an axial gap, extending in parallel to the ring axis over the axial ring width, into which the longitudinal rib extends.

2. The valve as recited in claim 1, wherein axial edges of the support ring that border the axial gap and lie opposite to each other press against the longitudinal rib.

3. A valve for metering a flowing medium, comprising:
a filter situated in a medium stream flowing from an inlet to a metering opening;
a filter ring containing a plurality of filter pores having an outer incident flow side pointing towards the inlet and an inner outgoing flow side pointing towards the metering opening; and
a supporting body supporting the filter ring on its flow-away side, wherein the supporting body is a radially elastic support ring having a plurality of through holes, which rests against the filter ring with radial prestressing, and wherein the filter ring and support body are situated in the flow of the medium stream in an interior of the valve;

wherein the filter has a rigid cage enclosing the filter ring having two end rings that are at an axial distance from each other and a plurality of axial crosspieces that connect the end rings to each other and are at a distance from one another in the circumferential direction, and the filter ring is affixed to the inner side of the cage, and wherein one of the axial crosspieces of the cage carries a longitudinal rib, and the support ring has an axial gap, extending in parallel to the ring axis over the axial ring width, into which the longitudinal rib extends.

4. The valve as recited in claim 3, wherein the support ring has a middle section with an inside and outside diameter larger than an outside diameter of a valve body of the valve and, in an uninstalled state, an end section dimensioned with a reduced inside diameter, wherein, the reduced inside diameter of the end section in the uninstalled state is smaller than the outside diameter of the valve body so that the end section is pressed on an outer surface of the valve body.

5. The valve as recited in claim 3, wherein an outer diameter of the support ring is larger than an inner diameter of the filter ring by a measure which produces the prestressing.

6. The valve as recited in claim 3, wherein a cross section of the through holes in the support ring is many times greater than the pore size of the filter pores in the filter ring.

7. The valve as recited in claim 6, wherein the filter ring is made of a fine-meshed filter web and the support ring is made of a coarse-meshed metal web.

8. The valve as recited in claim 6, wherein the filter ring is made of a fine-meshed filter web and the support ring is made of a perforated sheet metal jacket or plastic jacket.

9. The valve as recited in claim 8, wherein the support ring is bent from a perforated, rectangular plate having in each case two parallel longitudinal edges and transverse edges and is welded at a blunt or overlapping place of the transverse edges, yielded thereby, where they abut.

10. The valve as recited in claim 3, wherein the filter has a rigid cage enclosing the filter ring having two end rings that are at an axial distance from each other and a plurality of axial crosspieces that connect the end rings to each other and are at a distance from one another in the circumferential direction, and the filter ring is affixed to the inner side of the cage.

11. The valve as recited in claim 10, wherein the cage is made of plastic and the plastic is sprayed on the outside of the filter ring.

12. The valve as recited in claim 10 wherein axial lengths of the support ring and the cage are so coordinated with each other that the at least one end section lies in the area of an end ring of the cage.

13. The valve as recited in claim 10, wherein the filter is accommodated in a valve housing and sits on a valve body having at least one inlet bore to the metering opening, covering the inlet bore, and an inside diameter of an end section of the support ring is dimensioned so that the support ring sitting on the valve body produces a radial prestressing via the end section.

14. The valve as recited in claim 3, wherein the support ring has a diagonal gap running at an acute angle to the ring axis over a width of the ring.

15. The valve as recited in claim 3, wherein the filter ring is made of fine-meshed filter web and the support ring is made of a wire, which, in a meandering shape, is bent over the meandering width extending over the axial width of the support ring in such a way that outer meander branches formed by two ends of the wire lie opposite each other in a parallel manner and are welded to each other.

\* \* \* \* \*